US010902374B2

(12) United States Patent
Alandt et al.

(10) Patent No.: US 10,902,374 B2
(45) Date of Patent: Jan. 26, 2021

(54) ENCRYPTED TRANSIT INFORMATION FOR SHIPMENTS

(71) Applicant: International Business Machines Corporation, Armonk, NY (US)

(72) Inventors: Thomas J. Alandt, Knightdale, NC (US); William J. O. Green, Cary, NC (US); Alvin T. Hansen, Siler City, NC (US); Thomas S. Mazzeo, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 14/744,097

(22) Filed: Jun. 19, 2015

(65) Prior Publication Data

US 2016/0373413 A1  Dec. 22, 2016

(51) Int. Cl.
G06Q 10/08 (2012.01)

(52) U.S. Cl.
CPC ....... *G06Q 10/0835* (2013.01); *G06Q 10/083* (2013.01); *G06Q 2250/057* (2013.01)

(58) Field of Classification Search
CPC ......... G06Q 10/0835; G06Q 2250/057; G06Q 10/083
See application file for complete search history.

(56) References Cited

U.S. PATENT DOCUMENTS

| 6,622,050 | B2 * | 9/2003 | Thompson | G06Q 50/22 607/60 |
| 8,707,038 | B2 | 4/2014 | Braun et al. | |
| 2006/0031124 | A1 | 2/2006 | Galbraith | |
| 2007/0002139 | A1 * | 1/2007 | Benson | G05B 13/0275 348/143 |
| 2008/0303663 | A1 * | 12/2008 | Smith | B01L 99/00 340/550 |
| 2011/0074587 | A1 * | 3/2011 | Hamm | G06Q 10/08 340/584 |
| 2011/0107097 | A1 | 5/2011 | Braun et al. | |
| 2015/0022351 | A1 * | 1/2015 | Gettings | G08B 21/18 340/540 |

(Continued)

FOREIGN PATENT DOCUMENTS

WO    2014066610 A2    5/2014

OTHER PUBLICATIONS

Hendrik Haan, G., (2013). Adoption of Wireless Sensors in Supply Chains: A Process View Analysis of a Pharmaceutical Cold Chain. Journal of Theoretical and Applied Electronic Commerce Research, 8(2), 21-22.<https://doi.org/10.4067/s0718-18762013000200011 > Retrieved Sep. 23, 2020. (Year: 2013).*

(Continued)

Primary Examiner — Daniel Vetter
Assistant Examiner — Manal A. Alsamiri
(74) Attorney, Agent, or Firm — Tihon Poltavets

(57) ABSTRACT

A computer-implemented method includes receiving transit information from a first data logger, wherein the first data logger is associated with a first shipment. The method identifies a first user based on an identifier associated with the first shipment. The method queries the first user for credentials for verification. Responsive to determining the received credentials for verification from the first user match the credentials of record, the method sends the received transit information to the first user.

12 Claims, 4 Drawing Sheets

(56) References Cited

U.S. PATENT DOCUMENTS

| | | | | |
|---|---|---|---|---|
| 2015/0046364 A1* | 2/2015 | Kriss | ............... | G06Q 10/0833 |
| | | | | 705/333 |
| 2015/0302349 A1* | 10/2015 | Atkinson | ........... | G06K 19/0717 |
| | | | | 705/333 |
| 2016/0255420 A1* | 9/2016 | McCleland | ............. | G01S 19/51 |
| | | | | 340/870.07 |

OTHER PUBLICATIONS

Appendix P List of IBM Patents or Patent Applications Treated As Related Filed on: Apr. 26, 2016. pp. 2.

Alandt et al. Original U.S. Appl. No. 15/138,519, filed Apr. 26, 2016.

Wildgrube, M.; "Structured Data Exchange Format (SDXF) (RFC3072)"; An IP.com Prior Art Database Technical Disclosure; Original Publication Date; Mar. 1, 2001; IP.com No. 000005266; IP.com Electronic Publication: Aug. 20, 2001; Copyright © The Internet Society (2001); pp. 1-26.

"GSA Point to Point Soap/HTPPS Transport and Security Specification V1.1.3"; An IP.com Prior Art Database Technical Disclosure; IP.com No. 000205525; IP.com Electronic Publication: Mar. 29, 2011; pp. 1-6. Copyright 2011 Gaming Standards Association (GSA).

"Shock, Vibration & Acceleration Data Loggers"; MicroDAQ; Printed on: Feb. 27, 2015; pp. 1-2; <http://www.microdaq.com/data-logger/shock.php>.

"The Future of Retail"; ARUP Foresight; Nov. 2012; © ARUP, 2012.

\* cited by examiner

ENCRYPTED TRANSIT INFORMATION FOR SHIPMENTS

BACKGROUND

The present invention relates generally to handling of shipments and more particularly to encryption based handling of shipment information.

Typically, when shipping a product through a carrier network, the condition of the product is not known until the product reaches a destination of a recipient and the product is inspected for damage. Upon inspection, external damage to the product is visible to the recipient and the recipient can report the damage to the carrier prior to accepting the shipment. Reporting the damage to the carrier prior to accepting the delivery of the product results in the carrier being held responsible for the damages. However, certain products, such as computer servers, are susceptible to damage due to shock or vibrations. Damage caused by shock or vibration is typically not visible due to the damage being internal rather than external. As a result, the carrier may not be held responsible for any damages and the sending party has to cover the cost of repairs for the internal damage to the product potentially caused by the carrier.

SUMMARY

Embodiments of the present invention include a method, computer program product and computer system for handling information of shipments. A computer-implemented method includes: receiving, by one or more processors, transit information from a first data logger, wherein the first data logger is associated with a first shipment; identifying, by one or more processors, a first user based on an identifier associated with the first shipment; querying, by one or more processors, the first user for credentials for verification; and responsive to determining the received credentials for verification from the first user match the credentials of record, sending, by one or more processors, the received transit information to the first user.

DETAILED DESCRIPTION

Figure 1A:
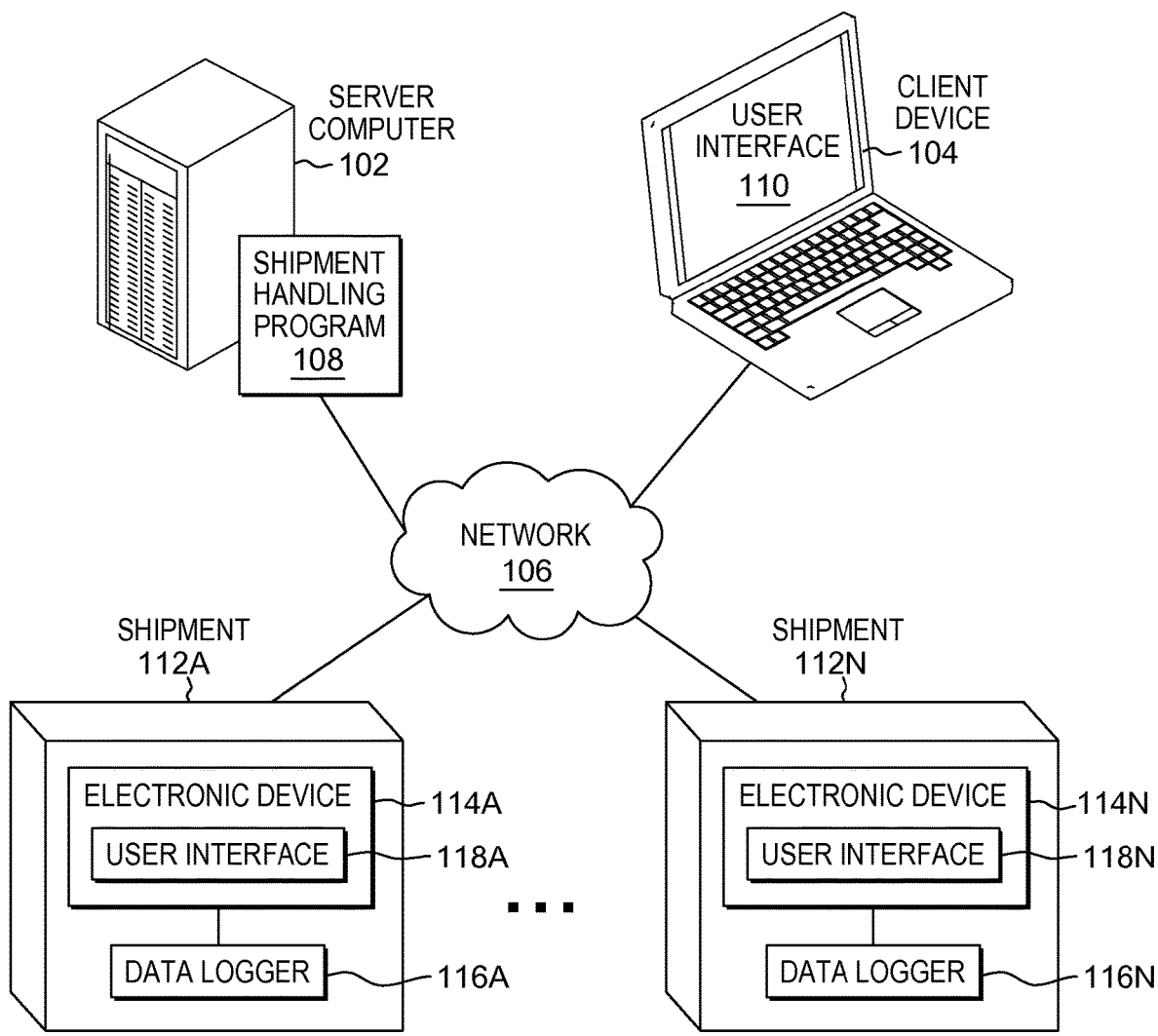
FIG. 1A is a functional block diagram illustrating a distributed data processing environment, in an embodiment in accordance with the present invention.

Example embodiments in accordance with the present invention will now be described in detail with reference to the drawing figures. FIG. 1A is a functional block diagram illustrating a data processing environment. The distributed data processing environment includes server computer 102, client device 104, and electronic device 114A through electronic device 114N connected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine readable program instructions and communicating with other computer devices via a network.

Shipment handling program 108 located on server computer 102 has the ability to initiate a transport process for shipments 112A through 112N provided by a sender. Shipment handling program 108 can receive package information and billing information for each of the shipments 112A through 112N. Shipment handling program 108 can create an identifier for each shipment 112A through 112N and associate data logger 116A though 116N with an identifier for each shipment 112A through 112N, respectively. Subsequently, shipment handling program 108 initializes the transport process for each shipment 112A through 112N.

Shipment handling program 108 has the ability to receive encrypted transit information for shipments 112A through 112N, where the encrypted transit information is accessible by a sender of shipments 112A through 112N (i.e., a user of client device 104). Shipment handling program 108 can receive transit information from data logger 116A through 116N when each shipment 112A through 112N reaches a touch point in the transport process. Shipment handling program 108 can identify a customer (i.e., a user of client device 104) based on the associated identifier for each shipment 112A through 112N and query the customer for credential verification. Upon determining credentials for verification match credentials on record, shipment handling program 108 decrypts the transit information for each shipment 112A through 112N utilizing an encryption key associated with the received verified credentials. Shipment handling program 108 can send the transit information for each shipment 112A through 112N to client device 104, where the customer can view the transit information.

Client device 104 may be a desktop computer, a laptop computer, a tablet computer, a specialized computer server, a smart phone, or any programmable electronic device capable of communicating with server computer 102 via internal network 106. In general, client device 104 represents any programmable electronic device or combination of programmable electronic devices capable of executing machine readable program instructions and communicating with other computing devices via a network, such as network 106.

User interface 110 provides an interface between a user of client device 104 and shipment handling program 108. User interface 110 may be a graphical user interface (GUI) or a web user interface (WUI) or a command line interface and can display text, documents, web browser windows, user options, application interfaces, and instructions for operation, and includes the information (such as graphic, text, and sound) a program presents to a user and the control sequences the user employs to control the program. User interface 110 may also be mobile application software that provides an interface between a user of client device 104 and shipment handling program 108. Mobile application software, or an "app", is a computer program designed to run on smart phones, tablet computers and other mobile devices. User interface 110 enables a user of client device 104 to provide credentials for verification to shipment handling program 108 and to view transit information for shipments 112A through 112N.

Shipments 112A through 112N each represent packages being sent to multiple recipients, not illustrated in FIG. 1. Each shipment 112A through 112N includes electronic device 114A through 114N, respectively. Electronic device 114A through 114N each provide a communication channel for transferring transit information recorded by data logger 116A through 116N for each shipment 112A through 112N. Each electronic device 114A through 114N communicates with data logger 116A through 116N and user interface 118A through 118N, respectively. Each data logger 116A through 116N has the ability to record various transit information including, for example, shock, vibrations, degree of tilt, temperature, light exposure, barometric pressure, moisture, longitudinal and latitudinal shift, and humidity. In this embodiment, data logger 116A through 116N are located internally on shipment 112A through 112N, respectively. In another embodiment, data logger 116A through 116N are located on electronic device 114A through 114N, where each electronic device 114 includes data logger 116 and user interface 118.

User interface 118A through 118N provides an interface between a package handler and shipment handling program 108. User interface 118A through 118N may be a graphical user interface (GUI) or a web user interface (WUI) or a command line interface and can display text, documents, web browser windows, user options, application interfaces, and instructions for operation, and includes the information (such as graphic, text, and sound) a program presents to a user and the control sequences the user employs to control the program. In this embodiment, each user interface 118A through 118N displays an identifier for each shipment 112A through 112N, respectively. The identifier can be, for example, a tracking number that is scanned at each touch point during the shipment process. Each user interface 118A through 118N can also display a transit bill for each shipment 112A through 112N.

In general, network 106 can be any combination of connections and protocols that will support communications among server computer 102, client device 104, and electronic device 114A through 114N. Network 106 can include, for example, a local area network (LAN), a wide area network (WAN), such as the internet, a cellular network, or any combination of the preceding, and can further include wired, wireless, and/or fiber optic connections. In one embodiment, shipment handling program 108 can be a web service accessible via network 106 to the user of client device 104. In another embodiment, shipment management program 108 may be operated directly by a user of server computer 102.

Figure 1B:
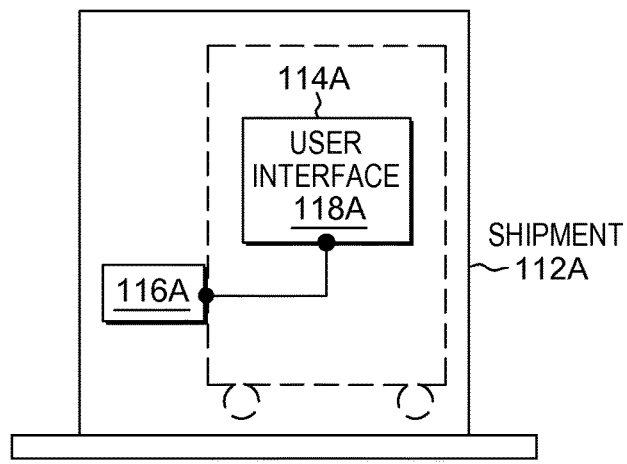
FIG. 1B is a functional block diagram illustrating one embodiment of a data logger and user interface on a shipment, in an embodiment in accordance with the present invention.

FIG. 1B is a functional block diagram illustrating one embodiment of a data logger and user interface on a shipment, in an embodiment in accordance with the present invention.

In this embodiment, shipment 112A represents an enclosed pallet containing an assembled piece of computer equipment, such as, a server rack. Electronic device 114A, located on the exterior of shipment 112A, includes an external display with user interface 118A. User interface 118A can display information such as an airway bill, a tracking number, an address of a recipient, an address of a sender, and transit information provided by data logger 116A. In this embodiment, data logger 116A is located internally on shipment 112A and records various transit information to which the assembled piece of computer equipment of the enclosed pallet experiences. Data logger 116A is connected to electronic device 114A and user interface 118A allows for the carrier company to obtain transit information from data logger 116A at various touch-points during the transportation of shipment 112A.

Figure 2:
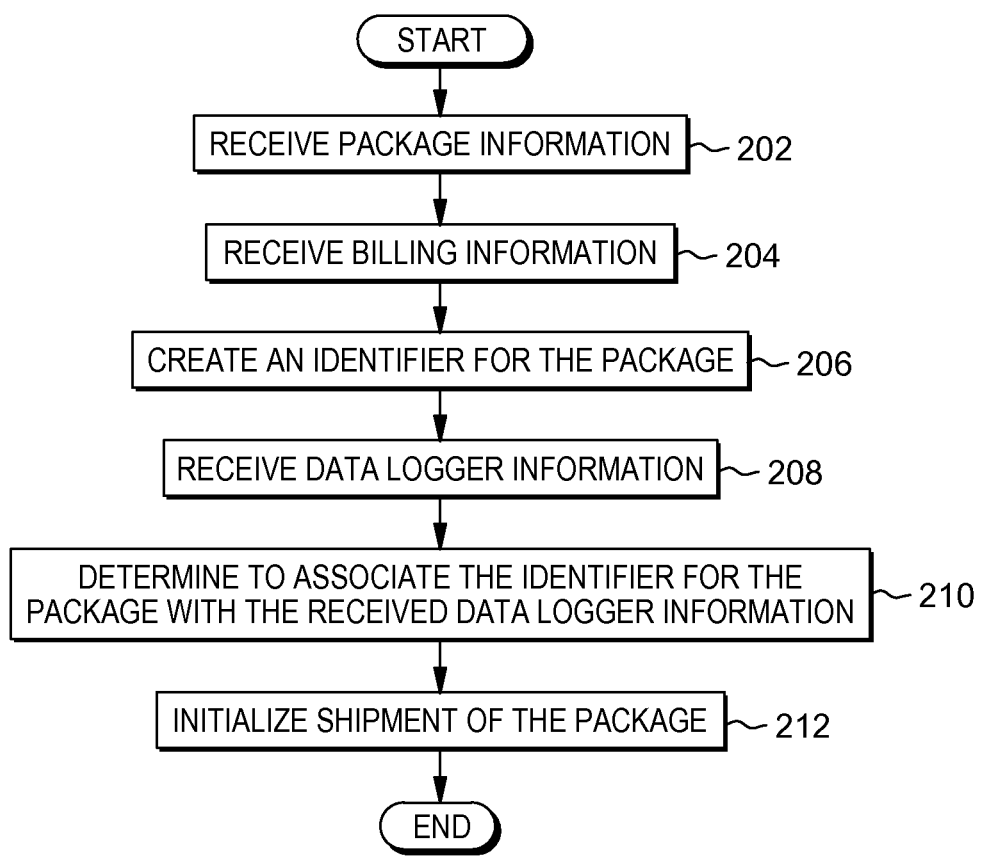
FIG. 2 is a flowchart depicting one embodiment of a shipment handling program for initiating a shipment of a package, in accordance with the present invention.

FIG. 2 is a flowchart depicting one embodiment of a shipment handling program for initiating a shipment of a package, in accordance with the present invention. As depicted, the method includes receiving (202) package information, receiving (204) billing information, creating (206) an identifier for the package, receiving (208) data logger information, determining (210) to associated the data logger with the identifier, and initializing (212) shipment of the package. In one embodiment, the method is conducted by shipment handling program 108.

The method may commence by receiving (202) package information. Shipment handling program 108 can receive package information including dimensions, weight, content, and handling instructions. The package information can also include whether the package includes a data logger for recording transit information. In this embodiment, shipment handling program 108 receives the package information from a user of client device 104, where the user of client device 104 is considered a sender of the package. The user of client device 104 sends the package information to shipment handling program 108 while preparing the package for shipment. In another embodiment, shipment handling program 108 receives the package information via a user interface (e.g., user interface 118A) on an electronic device (e.g., electronic device 114A) located on the package.

The method may continue by receiving (204) billing information. Shipment handling program 108 can receive billing information including a customer identification number, a destination address, a return address, and account information for a customer. In this embodiment, the customer identification number found in the billing information identifies the customer to whom the package is associated. Shipment handling program 108 can include a credential verification for the customer identification number found in the received billing information to ensure account security for the customer. Additional, the customer identification number also allows for shipment handling program 108 to query the customer for credential verification when sending transit information for the package. In this embodiment, shipment handling program 108 receives the billing information from a user of client device 104, where the user of client device 104 is considered a sender of the package. The user of client device 104 sends the billing information to shipment handling program 108 while preparing the package for shipment. In another embodiment, shipment handling program 108 receives the billing information via a user interface (e.g., user interface 118A) on an electronic device (e.g., electronic device 114A) located on the package.

The method may continue by creating (206) an identifier for the package. An example of an identifier for the package includes a bar code, a quick response (QR), a data matrix, a micro PDF, or any other unique identifier known in the art. In this embodiment, shipment handling program 108 utilizes a tracking number embedded in a bar code as an identifier for the package. The tracking number is unique to the package and provides an identification to the package being shipped.

The method may continue by receiving (208) data logger information. The data logger information identifies a specific data logger unique to the package. A data logger located on an electronic device on the package can record various transit information including shock, vibrations, degree of tilt, temperature, and humidity. However, data logger information can include a serial number identifying a specific data logger associated with the package. The serial number prevents a handler of the package from replacing the data logger on the package being shipped without the customer's knowledge. In this embodiment, shipment handling program 108 receives the data logger information from a user of client device 104. The user of client device 104 sends the data logger information to shipment handling program 108 subsequent to selecting the data logger which is going to record the transit information during the shipment of the package. In another embodiment, shipment handling program 108 receives the logger information via a user interface (e.g., user interface 118A) on an electronic device (e.g., electronic device 114A) with the data logger (e.g., data logger 116A).

The method may continue by determining (210) to associate the identifier for the package with the received data logger information. In this embodiment, shipment handling program 108 associates the identifier package with the received data logger information to prevent tampering of the transit information being recorded. A customer accessing the information of a particular package based on the created identifier for the package is ensured that the data logger shipment handling program 108 associates with the package is the same data logger from which transit information is received. In one example, shipment handling program 108 stores the association of the identifier for the package along with the received data logger information for the duration of the shipment. In another example, shipment handling program 108 stores the association of the identifier for the package along with the received data logger information for a predefined duration of time. As a result, shipment handling program 108 can maintain a history of the created identifiers for the packages.

The method may continue by initializing (212) shipment of the package. In this embodiment, shipment handling program 108 releases the package with the data logger to the carrier for shipment. Shipment handling program 108 can send a customer associated with the received billing information a notification that the shipment of the package has initialized and data logger information identifying the data logger from which transit information will be produced during the duration of the shipment of the package.

Figure 3:
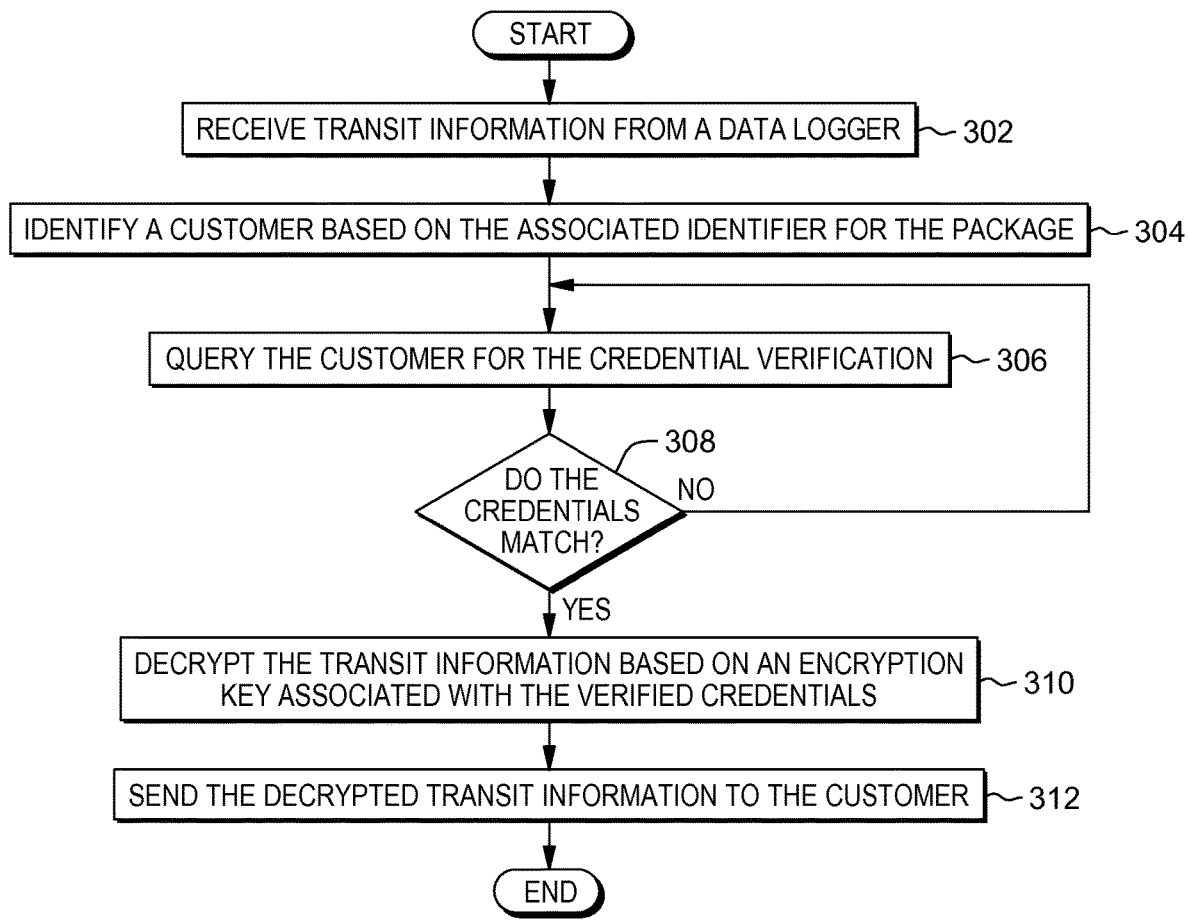
FIG. 3 is a flowchart depicting one embodiment of a shipment handling program for managing transit information of packages, in accordance with the present invention.

FIG. 3 is a flowchart depicting one embodiment of a shipment handling program for managing transit information of packages, in accordance with the present invention. As depicted, the method includes receiving (302) transit information from a data logger, identifying (304) a customer based on the associated identifier for the package, querying (306) the customer for credential information, determining (308) whether the credentials match, decrypting (310) the transit information based on an encryption key associated with the verified credentials, and sending (312) the decrypted transit information to the customer. In one embodiment, the method is conducted by shipment handling program 108.

The method may commence by receiving (302) transit information from a data logger. Shipment handling program 108 receives transit information from the data logger when the package reaches a touch point in the logistical setting of the carrier. A touch point represents any point in the logistical setting of the carrier where the identifier for the package is scanned, for example, when the package reaches a centralized hub or when the package is placed on a final delivery truck. Shipment handling program 108 can also continuously receive transit information from the data logger in the form of a live stream. For example, if the package is located on an airplane, shipment handling program 108 can connect with the data logger through an inflight Wi-Fi internet connection and continuously receive transit information from the data logger for the duration of the flight. Shipment handling program 108 can continuously receive the transit information and notify the customer if the data logger registers an event. An event can include, for example, a humidity level exceeding a particular percentage value (e.g., 70%) or a degree of tilt exceeding a particular threshold (e.g., 20°).

In this embodiment, the transit information shipment handling program 108 receives is encrypted, while the package identifier is not encrypted. The transit information remains encrypted until the customer associated with the package identifier verifies credentials, upon which an encryption key on the credentials decrypts the transit information for the customer to view. Encrypting the transit information prevents the carrier from altering the values in the transit information being receive from the data logger. In another embodiment, shipment handling program receives transit information that is decrypted, where the transit information does not require an encryption key from the credentials of the customer.

The method may continue by identifying (304) a customer based on the associated identifier for the package. In this embodiment, shipment handling program 108 receives the package identifier along with the transit information from the data logger. Shipment handling program 108 can utilizes the package identifier to retrieve billing information. The customer identification number found in the billing information identifies the customer to whom the package is associated.

The method may continue by querying (306) the customer for credential verification. Shipment handling program 108 utilizes the customer identification number to query the associated customer for credential verification in order to view the transit information. Shipment handling program 108 can send a notification prompting a window in the user interface (i.e., user interface 110) of the client device (i.e., client device 104) associated with the customer. In this embodiment, credentials of a customer include a customer identification number and a password for the account associated with the customer.

The method may continue by determining (308) whether the credentials match. In the event the credentials match ("yes" branch, 308), the method may continue by decrypting (310) the transit information based on an encryption key associated with the verified credentials. In the event the credentials do not match ("no" branch, 308), the method may query (306) the customer for credential verifications. In one embodiment, shipment handling program 108 can include an attempt limit for receiving credentials for verifications of a customer. For example, if the credentials do not match for three attempts by the customer, shipment handling program 108 can send a notification to the customer providing credentials, to contact the carrier to resolve the issue.

The method may continue by decrypting (310) the transit information based on an encryption key associated with the verified credentials. In this embodiment, shipment handling program 108 utilizes an encryption key embedded in the password of the verified credentials to decrypt the transit information. The encryption key is a piece of information (i.e., a parameter) that determines the functional output of a cryptographic algorithm or cipher. Without a key, the algorithm would produce no useful result. The encryption key transforms the ciphertext of the transit information into readable plaintext. The carrier does not have the ability to view the decrypted content prior to sending the decrypted transit information to the customer (312).

The method may continue by sending (312) the decrypted transit information to the customer. In this embodiment, shipment handling program 108 sends the decrypted transit information to a client device (i.e., client device 104) associated with the customer. The customer can view the transit information in a user interface (i.e., user interface 110) on the client device and determine whether to take an action in the shipment process of the package. For example, if a particular event in the transit information is registered by the data logger, the customer has the ability to see the date and time when the event occurred. Shipment handling program 108 can receive the specific date and time of the registered event by the data logger and send the registered event and customer's information to the carrier for investigation.

Figure 4:
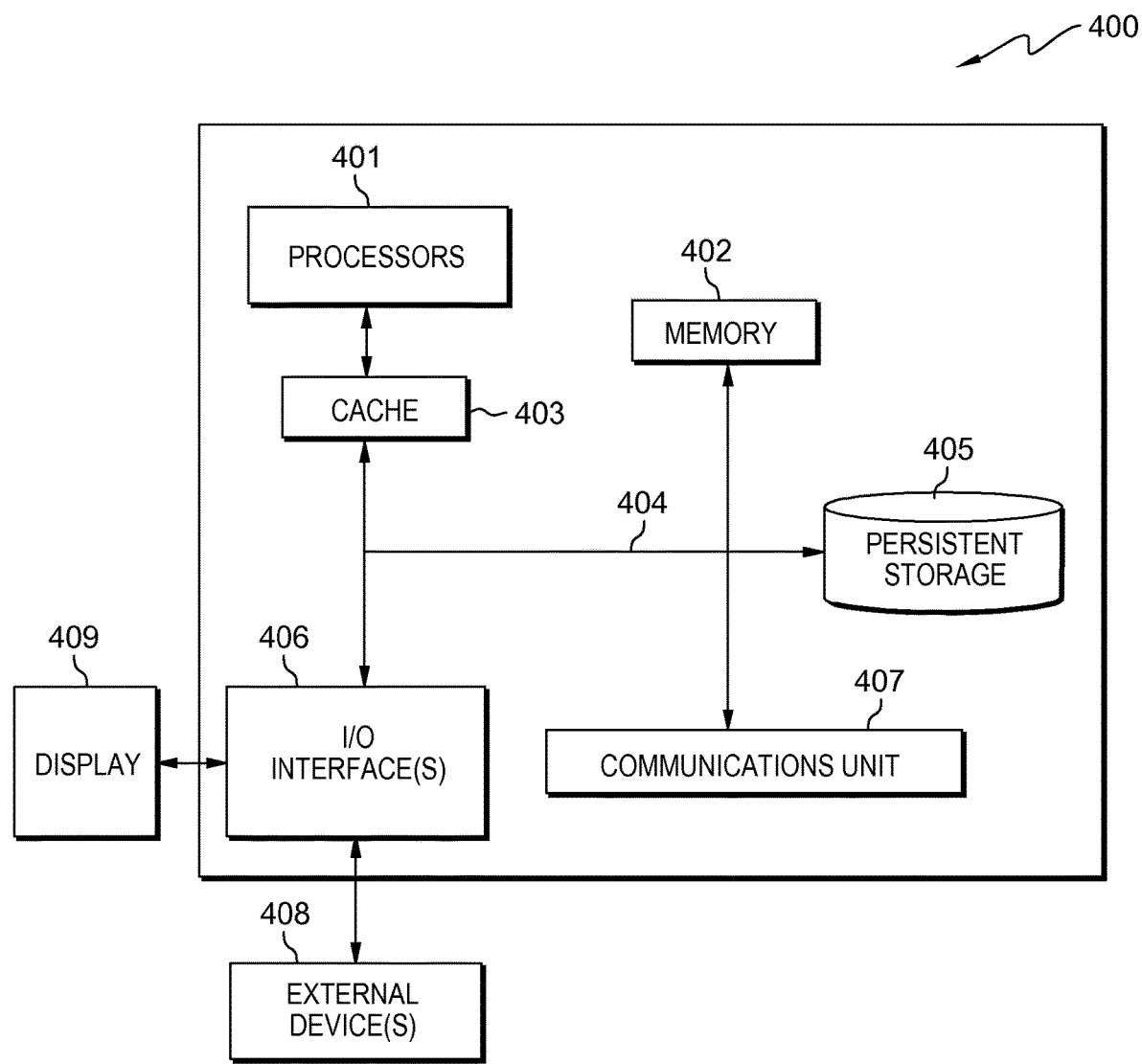
FIG. 4 is a block diagram of components of a computer system, such as the computer server of FIG. 1, in an embodiment in accordance with the present invention.

FIG. 4 depicts computer system 400, where server computer 102 is an example of a system that includes shipment handling program 108. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   creating, by one or more processors, an identifier for a first shipment for displaying in a user interface of an electronic device electrically connected to a first data logger associated with the first shipment by a carrier;
   initializing, by one or more processors, a transport process of the first shipment;
   responsive to the first data logger associated with the first shipment connecting to an inflight Wi-Fi internet connection, receiving, by one or more processors, encrypted transit information from the first data logger, wherein the encrypted transit information prevents the carrier from altering one or more values received from the first data logger;
   identifying, by one or more processors, a first user based on the identifier for the first shipment;
   querying, by one or more processors, the first user for credentials for verification;
   determining, by one or more processors, the received credentials for verification from the first user match the credentials of record;
   responsive to decrypting the encrypted transit information based on an encryption key embedded in the credentials for verification from the first user, sending, by one or more processors, by the carrier, decrypted transit information to the first user, wherein the carrier does not have the ability to view the decrypted transit information prior to sending to the first user; and
   responsive to receiving a specific date and time for a first registered event from the first user to send to the carrier, sending, by one or more processors, to the carrier, customer information associated with the first user and the first registered event from the decrypted transit information for investigation, wherein the carrier did not have the ability to view the first registered event from the decrypted transit information.

2. The method of claim 1, further comprising:
   receiving, by one or more processors, billing information associated with the first shipment, wherein the billing information identifies the first user.

3. The method of claim 2, further comprising:
   receiving, by one or more processors, at the user interface of the electronic device electrically connected to the first data logger, data logger information for identification of the first data logger; and sending, by one or more processors, the data logger information for the first data logger associated with the first shipment.

4. The method of claim 1, wherein transit information includes at least one of the following: shock, vibrations, degree of tilt, temperature, and humidity.

5. A computer program product comprising:

one or more computer readable tangible storage media and program instructions stored on at least one of the one or more storage media, the program instructions comprising:

program instructions to create an identifier for a first shipment for displaying in a user interface of an electronic device electrically connected to a first data logger associated with the first shipment by a carrier;

program instructions to initialize a transport process of the first shipment;

program instructions to, responsive to the first data logger associated with the first shipment connecting to an inflight Wi-Fi internet connection, receive encrypted transit information from the first data logger, wherein the encrypted transit information prevents the carrier from altering one or more values received from the first data logger;

program instructions to identify a first user based on the identifier for the first shipment;

program instructions to query the first user for credentials for verification;

program instructions to determine the received credentials for verification from the first user match the credentials of record;

program instructions to, responsive to decrypting the encrypted transit information based on an encryption key embedded in the credentials for verification from the first user, send, by the carrier, decrypted transit information to the first user, wherein the carrier does not have the ability to view the decrypted transit information prior to sending to the first user; and program instructions to, responsive to receiving a specific date and time for a first registered event from the first user to send to the carrier, sending, by one or more processors, to the carrier, customer information associated with the first user and the first registered event from the decrypted transit information for investigation, wherein the carrier did not have the ability to view the first registered event from the decrypted transit information.

6. The computer program product of claim 5, further comprising program instructions, stored on the one or more computer readable storage media, which when executed by a processor, cause the processor to:

receive billing information associated with the first shipment wherein the billing information identifies the first user.

7. The computer program product of claim 6, further comprising program instructions, stored on the one or more computer readable storage media, which when executed by a processor, cause the processor to:

receive at the user interface of the electronic device electrically connected to the first data logger, data logger information for identification of the first data logger; and send the data logger information for the first data logger associated with the first shipment.

8. The computer program product of claim 5, wherein transit information includes at least one of the following: shock, vibrations, degree of tilt, temperature, and humidity.

9. A computer system comprising:

one or more computer processors;

one or more computer readable storage media; and program instructions stored on the computer readable storage media for execution by at least one of the one or more computer processors, the program instructions comprising: program instructions to create an identifier for a first shipment for displaying in a user interface of an electronic device electrically connected to a first data logger associated with the first shipment by a carrier;

program instructions to initialize a transport process of the first shipment;

program instructions to, responsive to the first data logger associated with the first shipment connecting to an inflight Wi-Fi internet connection, receive encrypted transit information from the first data logger, wherein the encrypted transit information prevents the carrier from altering one or more values received from the first data logger;

program instructions to identify a first user based on the identifier for the first shipment;

program instructions to query the first user for credentials for verification;

program instructions to determine the received credentials for verification from the first user match the credentials of record; and program instructions to, responsive to receiving a specific date and time for a first registered event from the first user to send to the carrier, sending, by one or more processors, to the carrier, customer information associated with the first user and the first registered event from the decrypted transit information for investigation, wherein the carrier did not have the ability to view the first registered event from the decrypted transit information.

10. The computer system of claim 9, further comprising program instructions, stored on the one or more computer readable storage media, which when executed by a processor, cause the processor to:

receive billing information associated with the first shipment, wherein the billing information identifies the first user.

11. The computer system of claim 10, further comprising program instructions, stored on the one or more computer readable storage media, which when executed by a processor, cause the processor to:

receive at the user interface of the electronic device electrically connected to the first data logger, data logger information for identification of the first data logger; and send the data logger information for the first data logger associated with the first shipment.

12. The computer system of claim 9, wherein transit information includes at least one of the following: shock, vibrations, degree of tilt, temperature, and humidity.

* * * * *